United States Patent [19]

Spall et al.

[11] Patent Number: 5,513,098
[45] Date of Patent: Apr. 30, 1996

[54] METHOD FOR MODEL-FREE CONTROL OF GENERAL DISCRETE-TIME SYSTEMS

[75] Inventors: James C. Spall, Ellicott City; John A. Cristion, Columbia, both of Md.

[73] Assignee: The Johns Hopkins University, Baltimore, Md.

[21] Appl. No.: 364,069

[22] Filed: Dec. 27, 1994

Related U.S. Application Data

[63] Continuation of Ser. No. 73,371, Jun. 4, 1993, abandoned.

[51] Int. Cl.$^6$ ............................ G05B 13/04; G06F 15/18
[52] U.S. Cl. ........................ 364/158; 364/157; 364/165; 395/21; 395/906
[58] Field of Search ........................... 364/148, 149–151, 364/157, 158, 164, 165; 395/21–23, 904, 905, 912, 913, 919, 906

[56] References Cited

U.S. PATENT DOCUMENTS

| | | | |
|---|---|---|---|
| 5,119,468 | 6/1992 | Owens | 364/165 X |
| 5,159,660 | 10/1992 | Lu et al. | 364/165 X |
| 5,175,678 | 12/1992 | Frerichs et al. | 364/165 X |
| 5,268,834 | 12/1993 | Sanner et al. | 364/151 |
| 5,282,261 | 1/1994 | Skeirik | 364/164 X |
| 5,285,377 | 2/1994 | Sugasaka et al. | 364/164 X |

OTHER PUBLICATIONS

James C. Spall, Multivariate Stochastic Approximation Using a Simultaneous Perturbation Gradient Approximation, Mar. 1992, pp. 332–341, IEEE Transactions on Automatic Control, vol. 37, No. 3.

James C. Spall and John A. Cristion, Neural Networks for Control of Uncertain Systems, 8–10 Apr. 1991, pp. 575–588, Technical Proceedings, Test Technology Symposium IV, Technology Development Division, Directorate for Technology, U.S. Army Test and Evaluation Command.

James C. Spall, Multivariate Stochastic Approximation Using a Simultaneous Perturbation Gradient Approximation, Aug. 6–9, 1990, pp. 32–41, American Statistical Association, Alexandria, VA., Annual Meeting, Proceedings of the Bus, and Econ. Statistics Section.

James C. Spall, A Stochastic Approximation Algorithm for Large–Dimensional Systems in the Kiefer–Wolfowitz Setting, Dec. 1988, pp. 1544–1548, Proceedings of the 27th Conference on Decision and Control, Austin, Texas.

*Primary Examiner*—Joseph Ruggiero
*Attorney, Agent, or Firm*—Francis A. Cooch

[57] ABSTRACT

A method of developing a controller for general (nonlinear) discrete-time systems, where the equations governing the system are unknown and where a controller is estimated without building or assuming a model for the system. The controller is constructed through the use of a function approximator (FA) such as a neural network or polynomial. This involves the estimation of the unknown parameters within the FA through the use of a stochastic approximation that is based on a simultaneous perturbation gradient approximation, which requires only system measurements (not a system model).

10 Claims, 3 Drawing Sheets

METHOD FOR MODEL-FREE CONTROL OF GENERAL DISCRETE-TIME SYSTEMS

STATEMENT OF GOVERNMENTAL INTEREST

The Government has rights in this invention pursuant to Contract No. N00039-91-0001 awarded by the Department of the Navy.

This is a continuation of copending application Ser. No. 08/073,371 filed on Jun. 4, 1993 now abandoned.

BACKGROUND OF THE INVENTION

The invention relates to the control of complex, general (nonlinear), discrete-time, e.g., physical, socioeconomic or biological, systems in which not only the parameters but the equations governing the system are unknown. More specifically, the invention is a method for estimating a system controller without building or assuming a model for the system. The controller is constructed through the use of a function approximator such as a neural network or polynomial which, in turn, uses a stochastic approximation algorithm. The algorithm is based on a simultaneous perturbation gradient approximation which requires only system measurements, not a system model.

Frequently, a system designer must determine a means to control and regulate a system when there is uncertainty about the nature of the underlying process. Adaptive control procedures have been developed in a variety of areas for such problems (e.g., manufacturing process control, robot arm manipulation, aircraft control, etc.), but these are typically limited by the need to assume that the forms of the system equations are known (and usually linear) while the parameters may be unknown. In complex physical, socioeconomic, or biological systems, however, the forms of the system equations (typically nonlinear), as well as the parameters, are often unknown, making it impossible to determine the control law needed in existing adaptive control procedures.

Numerous current methods use a function approximation (FA) technique to construct the controller for such systems. Associated with any FA will be a set of parameters that must be determined. Popular FAs include, for example, polynomials, multilayered feed-forward neural networks, recurrent neural networks, splines, trigonometric series, radial basis functions, etc.

By results such as the well-known Stone-Weierstrass approximation theorem, it can be shown that many of these FA techniques share the property that they can be used to approximate any continuous function to any degree of accuracy (of course, this is merely an existence result, so experimentation must usually be performed in practice to ensure that the desired level of accuracy with a given FA is being achieved). Each FA technique tends to have advantages and disadvantages, e.g., polynomials have a relatively easy physical interpretability, but the number of parameters to be determined grows rapidly with input dimension or polynomial order.

Others have considered the problem of developing controllers based on FAs when there is minimal information about the system equations. The vast majority of such techniques are indirect control methods in the sense that a second FA is introduced to model the open-loop behavior of the system. This open-loop FA is typically determined from sample input-output "training" data on the system prior to operating the system in closed loop and constructing the controller FA.

It is not possible in this model-free framework to obtain the derivatives necessary to implement standard gradient-based search techniques (such as back-propagation) for estimating the unknown parameters of the FA. Stochastic approximation (SA) algorithms based on approximations to the required gradient will, therefore, be considered. Usually such algorithms rely on well-known finite-difference approximations to the gradient. The finite-difference approach, however, can be very costly in terms of the number of system measurements required, especially in high-dimensional problems such as estimating an FA parameter vector (which may easily have dimension of order $10^2$ or $10^3$). Further, real-time implementation of finite-difference methods would often suffer since the underlying system dynamics may change during the relatively long period in which measurements are being collected for one gradient approximation.

There is therefore a need for a control procedure that does not require a model for the underlying system.

SUMMARY OF THE INVENTION

The method of the invention uses the system measurements to determine a controller without the need to estimate or assume a separate model for the system. The controller acts as a function, taking as input past and current system information and producing as output a control value to affect future system performance.

Since the method of the invention is generic, it will be presented without regard to which type of FA is to be used, although the invention will be demonstrated using polynomials and neural networks.

The direct control method of the invention does not require any open-loop estimation, instead constructing the one (controller) FA while the system is operating in closed-loop. Thus we avoid the need for open loop "training" data, which may be difficult or expensive to obtain, and the need to estimate perhaps twice as many parameters (for constructing two FAs). Further, the invention offers potential advantages in being better able to handle changes in the underlying system dynamics (since it is not tied to a prior system model) and being more robust in the face of widely varying control inputs (i.e., the indirect approach may perform poorly for closed-loop controls outside of the range of open-loop controls used in the prior identification step).

The invention uses a SA algorithm based on a "simultaneous perturbation" gradient approximation, which is typically much more efficient than the finite-difference SA algorithms in the amount of data required. In particular, the simultaneous perturbation approximation requires only two system measurements versus the hundreds (or more) typically required in finite-difference methods.

DETAILED DESCRIPTION OF THE PREFERRED EMBODIMENT

Consider a general discrete-time state-space system of the form $$x_{k+1} = \phi_k(x_k, u_k, w_k), \quad \text{(state)} \quad (1)$$
$$y_k = h_k(x_k, v_k), \ k = 0, 1, 2, \ldots \quad \text{(measurement)} \quad (2)$$

where $\phi_k(\cdot)$ and $h_k(\cdot)$ are generally unknown nonlinear functions governing the system dynamics and measurement process, $u_k$ is the control input applied to govern the system at time $k+1$, and $w_k$, $v_k$ are noise terms (not necessarily serially independent or independent of each other). Based on information contained within measurements and controls up to $y_k$ and $u_{k-1}$, the goal is to choose a control $u_k$ in a manner such that some loss function related to the next measurement $y_{k+1}$ is minimized. Oftentimes, this loss function will be one that compares $y_{k+1}$ against a target value $t_{k+1}$, penalizing deviations between the two. Without sacrificing generality, the focus below will be on this target-tracking control problem, although the method of the invention would apply in other (e.g., optimal control) problems as well, as discussed briefly below.

In the method of the invention, a function approximator (FA) (e.g., neural network, polynomial) will be used to produce the control $u_k$. An FA of fixed structure across time (e.g., the number of layers and nodes in a neural network is fixed) will be considered but underlying parameters in the FA (e.g., connection weights in a neural network) will be allowed to be updated. Since past information will serve as input to the control, this fixed structure requires that $u_k$ be based on only a fixed number of previous measurements and controls (in contrast to using all information available up to time $k$ for each $k$). Suppose the "sliding window" of previous information available at time $k$, say $I_k$, contains $M$ previous measurements and $N$ previous controls. Thus when the system is operating without the FA parameters being updated, we have $$I_k = \{y_k, y_{k-1}, \ldots, y_{k-M+1}, u_{k-1}, u_{k-2}, \ldots, u_{k-N}\}$$

(when the FA parameters are being updated the set $I_k$ of $M$ and $N$ previous measurements and controls will contain "test" values, as discussed below.)

Figure 1A:
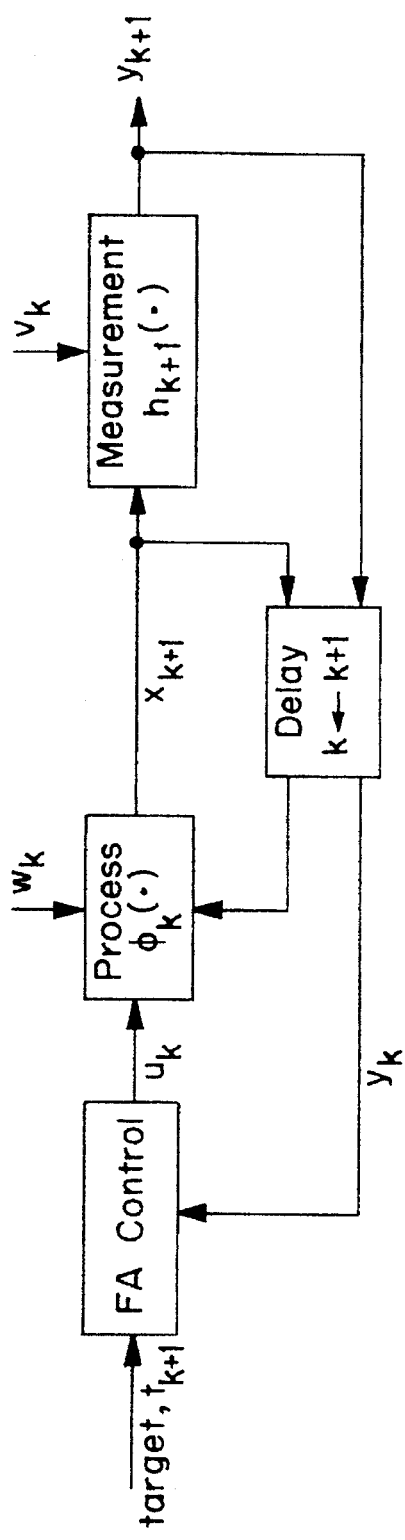
FIGS. 1a and 1b illustrate in block diagram format the direct approximation and self-tuning implementations, respectively, of the method of the invention.
Figure 1B:
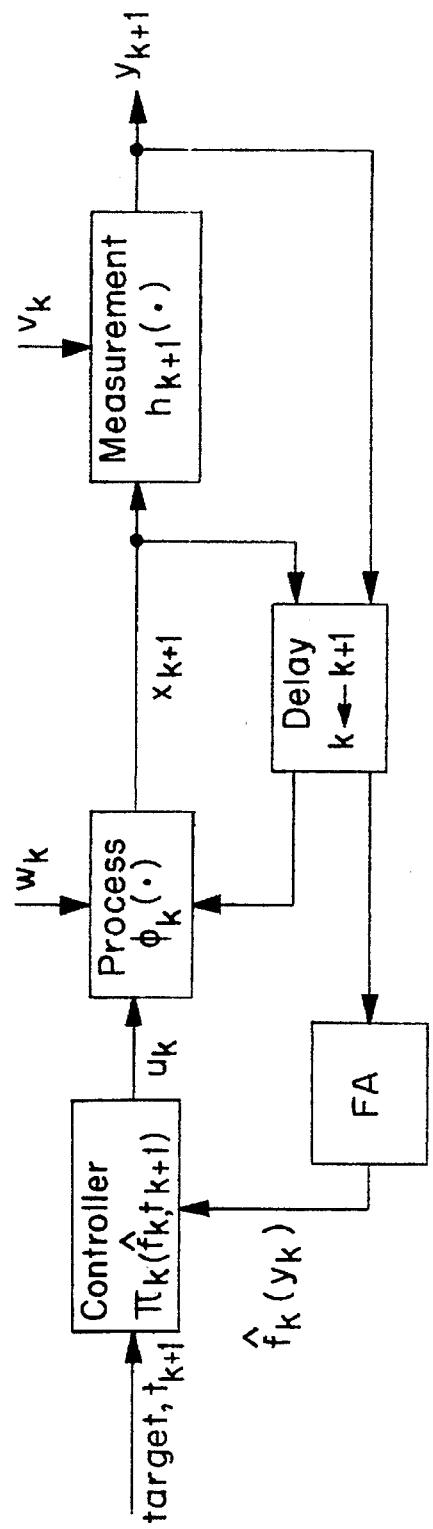

Two methods to the problem of controlling the system of equations (1) and (2) in the face of uncertainty about the form of $\phi_k(\cdot)$ and $h_k(\cdot)$ will be considered, as illustrated in FIGS. 1a and 1b, for the target-tracking problem in the important special case where $I_k = \{y_k\}$ (for the more general definition of $I_k$, as given above, the diagrams would be modified in an obvious way). In the direct approximation method of FIG. 1a, the output of the FA will correspond directly to the elements of the $u_k$ vector, i.e. the inputs to the FA will be $I_k$ ($=y_k$ here) and $t_{k+1}$ and the output will be $u_k$. This approach is appropriate, e.g., when both $\phi_k(\cdot)$ and $h_k(\cdot)$ are unknown functions.

In contrast, the self-tuning method of FIG. 1b requires some prior information about the form of $\phi_k(\cdot)$ and $h_k(\cdot)$. In particular, it requires that enough information be available to write $u_k = \pi_k(f_k(I_k), t_{k+1})$, where $\pi_k(\cdot)$ is a known control law that depends on some unknown function $f_k(\cdot)$. As demonstrated below, a very important type of process to which this second method can apply is an affine-nonlinear (i.e., generalized bilinear) system. When prior information associated with knowledge of $\phi_k(\cdot)$ and $h_k(\cdot)$ is available, the self-tuning method of FIG. 1b is often able to yield a controller superior to the direct approximation method of FIG. 1a.

Associated with the FA generating $u_k$ will be a parameter vector $\theta_k$ that must be estimated (e.g., the connection weights in a neural network). It is assumed that the FA structure is fixed across time. Hence the adaptive control problem of finding the optimum control at time $k$ is equivalent to finding the $\theta_k \in \mathbb{R}^p$, $p$ not a function of $k$, that minimizes some loss function $L_k(\theta_k)$. A common loss is the one-step-ahead quadratic tracking error, $$L_k(\theta_k) = E[(y_{k+1} - t_{k+1})^T A_k (y_{k+1} - t_{k+1}) + u_k^T B_k u_k], \quad (3)$$

where $A_k$, $B_k$ are positive semi-definite matrices reflecting the relative weight to put on deviations from the target and on the cost associated with larger values of $u_k$. The invention would also apply with non-quadratic and/or non-target-tracking loss functions. Such functions might arise, e.g., in constrained optimal control problems where we are trying to minimize some cost (without regard to a specific target value) and penalty functions are used for certain values of $y_{k+1}$ and/or $u_k$ to reflect problem constraints. For convenience, however, this discussion will illustrate points with the target tracking problem exemplified by equation (3). Note that although equation (3) is a one-time-step error function, much of the adaptive control literature focuses on minimizing a loss function over an infinite horizon. Note also that if the unconditional loss function $L_k(\theta_k)$ were replaced by a conditional loss as is sometimes seen in the control literature (e.g., equation (3)) replaced by an expected tracking error conditional on previous measurements and controls), the same optimal $\theta_k$ would result; this follows since under modest conditions, $E(\partial L_k^{cond}/\partial \theta_k) = \partial E(L_k^{cond})/\partial \theta_k = \partial L_k/\partial \theta_k = 0$ at the optimal $\theta_k$, where $L_k^{cond}$ represents the conditional loss.

With a control of the form in FIG. 1a or 1b, the problem of minimizing $L_k(\theta_k)$ implies that for each $k$ we are seeking the globally optimal $\theta^*_k$ such that $$g_k(\theta_k) = \frac{\partial L_k}{\partial \theta_k} = \frac{\partial u_k^T}{\partial \theta_k} \cdot \frac{\partial L_k}{\partial u_k} = 0 \text{ at } \theta_k = \theta_k^*. \quad (4)$$

Since $\phi_k(\cdot)$ and $h_{k+1}(\cdot)$ are incompletely known functions, the term $\partial L_k/\partial u_k$, which involves the terms $\partial h_{k+1}/\partial x_{k+1}$ and $\partial \phi_k/\partial u_k$, is not generally computable. Hence, $g_k(\theta_k)$ is not generally available in either of the methods in FIGS. 1a and 1b.[1] To illustrate this fact, consider a simple scalar-deterministic version of the system of equations (1) and (2). Then, under the standard squared-error loss, $$g_k(\theta_k) = \frac{\partial (y_{k+1} - t_{k+1})^2}{\partial \theta_k} =$$

$$2(y_{k+1} - t_{k+1}) \frac{\partial h_{k+1}}{\partial x_{k+1}} \frac{\partial \phi_k}{\partial u_k} \frac{\partial u_k}{\partial \theta_k}.$$

We see that the right-hand side of the above equation contains unknown expressions. The same principles apply in the more general multivariate stochastic version of the model of equations (1) and (2). Thus the standard gradient descent algorithm (e.g., back-propagation) or any other algorithm involving $g_k(\theta_k)$, is not feasible.

[1] This contrasts with implementations of so-called indirect feedback controllers where a separate FA is used to model the unknown system dynamics and the identification and adaptive control is performed as if the FA model was identical in structure to the true system dynamics. One special case where $g_k(\theta_k)$ can be computed is in the self-tuning setting of FIG. 1b where $h_k(\cdot)$ is a known function and $u_k(\cdot)$ is known to enter $\phi_k(\cdot)$ additively (since $\partial \phi_k/\partial u_k$ then does not depend on unknown dynamics); such additive control models are considered for continuous time. Of course, in the more general setting of direct approximation control (FIG. 1a) $g_k(\theta_k)$ would still be unavailable.

Because gradient-descent-type algorithms are not generally feasible in the model-free setting here, the method of the invention uses a stochastic approximation (SA) algorithm of the form $$\hat{\theta}_k = \hat{\theta}_{k-1} - a_k \text{ (gradient approx.)}_k \quad (5)$$

to estimate $\{\theta_k\}$, where $\hat{\theta}_k$ denotes the estimate at the given iteration, $\{a_k\}$ is a scalar gain sequence satisfying certain regularity conditions, and the gradient approximation is such that it does not require knowledge of $\phi_k(\cdot)$ and $h_k(\cdot)$ in equations (1) and (2).

Recall that what is being sought is the FA parameter vector at each time point that minimizes $L_k(\theta_k)$, i.e., a $\theta^*_k$ such that $g_k(\theta^*_k)=0$. Recall also that since gradient-based search algorithms are not applicable, an SA-based approach will be considered.

A detailed analysis of the SPSA approach to optimization in the classical setting of a time-invariant loss function $L(\cdot)$ and corresponding fixed minimum is discussed in Spall, J. C. [1992], "Multivariate Stochastic Approximation Using a Simultaneous Perturbation Gradient Approximation," *IEEE Trans. Auto. Control*, vol. 37, pp. 332–341 (hereafter Spall [1992]). It is shown that the SPSA algorithm has the usual almost sure (a.s.) convergence and asymptotic normality properties of finite-difference SA (FDSA) algorithms of the Kiefer-Wolfowitz form, but that the asymptotic normality result indicates that SPSA can achieve the same level of asymptotic accuracy as FDSA with only 1/p the number of system measurements. This is of particular interest in FAs for nonlinear, multivariate problems since p can easily be on the order of $10^2$ or $10^3$. Of course, in the control setting here the loss function $L_k(\cdot)$ is generally time-varying and hence it can not be automatically assumed that the results of Spall [1992] apply. Therefore, the conditions under which the SPSA estimation error $\hat{\theta}_k - \theta^*_k$ converges a.s. to zero as in the time-variant loss setting will be presented.

Unfortunately, it does not appear possible to similarly produce an asymptotic normality result for the time-varying $L_k(\cdot)$ setting, which would provide a formal proof that asymptotically SPSA achieves the same level of accuracy as Finite-Difference Stochastic Approximation (FDSA) with only $1/p^{th}$ the number of measurements for the gradient approximations. This follows from the fact that the limiting mean and variance of the asymptotic normal distribution in Spall [1992] are based on the (fixed) values of the second and third derivatives of the loss function and, of course, such fixed values do not exist in the time-varying setting here. Nevertheless, the proven advantage of SPSA in the fixed loss function case together with the a.s. convergence of SPSA established below for the time-varying $L_k(\cdot)$ setting provide ample theoretical evidence of the advantage of SPSA over the standard FDSA approach in our control problem.

In line with equations (4) and (5), the SPSA algorithm has the form $$\hat{\theta}_k = \hat{\theta}_{k-1} - a_k \hat{g}_k(\hat{\theta}_{k-1}) \quad (6)$$

where $\hat{g}_k(\hat{\theta}_{k-1})$ is the simultaneous perturbation approximation to $g_k(\hat{\theta}_{k-1})$. In particular the $l^{th}$ component of $\hat{g}_k(\hat{\theta}_{k-1})$, $l=1, 2, \ldots, p$, is given by $$\hat{g}_{kl}(\hat{\theta}_{k-1}) = \frac{\hat{L}_k^{(+)} - \hat{L}_k^{(-)}}{2c_k \Delta_{kl}}, \quad (7)$$

where $\hat{L}_k^{(\pm)}$ are estimated values of $L_k(\hat{\theta}_{k-1} \pm c_k \Delta_k)$ using the observed $y_{k+1}^{(\pm)}$ and $u_k^{(\pm)}$, e.g., for $L_k(\theta_k)$ as in (2.2), $\hat{L}_k^{(\pm)} = (y_{k+1}^{(\pm)} - t_{k+1})^T A_k (y_{k+1}^{(\pm)} - t_{k+1}) + u_k^{(\pm)T} B_k u_k^{(\pm)}$ $u_k^{(\pm)}$ are controls based on a FA with parameter vector $\theta_k = \hat{\theta}_{k-1} \pm c_k \Delta_k$, where $\Delta_k = (\Delta_{k1}, \Delta_{k2}, \ldots, \Delta_{kp})^T$, with the $\{\Delta_{ki}\}$ independent, bounded, symmetrically distributed (about 0) random variables $\forall k, i$, identically distributed at each k, with $E(\Delta_{kl}^{-2})$ uniformly bounded $\forall k, i$ (see below for comments on this latter [critical] regularity condition), $y_{k+1}^{(\pm)}$ are measurements based on $u_k^{(\pm)}$, $\{c_k\}$ is a sequence of positive numbers satisfying certain regularity conditions (typically $c_k \to 0$ or $c_k = c$ $\forall k$, depending on whether the system equations are stationary or nonstationary, as discussed below).

The key fact to observe is that at any iteration only two measurements are needed to approximate $g_k(\cdot)$ (i.e., the numerators are the same for all p components). This is in contrast to the standard FDSA approach where 2p measurements are needed (i.e., for the $l^{th}$ component of the gradient approximation, the quantity $\Delta_k$ is replaced by a vector with a positive constant in the $l^{th}$ place and zeroes elsewhere). A variation on the form in equation (7) is to average several gradient approximations, with each vector in the average being based on a new (independent) value of $\Delta_k$ and a corresponding new pair of measurements; this will often enhance the performance of the algorithm. (Note that at each k the process and measurement functions $\phi_k(\cdot)$, $h_{k+1}(\cdot)$ are assumed to remain stationary during the period in which $\hat{g}_k(\cdot)$ is being generated.) A further variation on equation (7) is to smooth across time by a weighted average of the previous and current gradient estimates (analogous to the "momentum" approach in back-propagation); such smoothing can often improve the performance of the algorithm.

There are several ways in which a practical control strategy could be implemented using the SPSA algorithm in equations (6) and (7). These differences result from whether or not it is desired to produce a "nominal" $x_{k+1}$ and $y_{k+1}$ based on a control with updated $\theta_k = \hat{\theta}_k$ (only $x_{k+1}^{(\pm)}$, $y_{k+1}^{(\pm)}$ are required in implementing equations (6) and (7) which use $\theta_k = \hat{\theta}_{k-1} \pm c_k \Delta_k$) and whether or not it is possible to reset the system from a given state value to the previous state value. As an illustration of a strategy for neural network-based control when direct measurement of the states exists, suppose that we wish to produce a sequence of system measurements that includes nominal measurements, i.e., the sequence is $\{y_0, y_1^{(+)}, y_1^{(-)}, y_1, y_2^{(+)}, y_2^{(-)}, y_2, \ldots\}$, and that the system cannot be readily reset from one state to the previous state (as is quite common). Then, as discussed above, each of $u_k^{(+)}$, $u_k^{(-)}$, $u_k$ are produced using the previous M measurements and N controls, which comprise the information sets $I_k^{(+)}$, $I_k^{(-)}$, and $I_k$ (say) respectively (note that the elements of $I_k$ here will differ from those above where no parameter update is taking place). Thus, for example, if M=N=2, then $u_k^{(-)}$ is based on $\theta_k = \hat{\theta}_{k-1} - c_k \Delta_k$, $t_{k+1}$, and $I_k^{(-)} = \{y_{k+1}^{(+)}, y_k, u_k^{(+)}, u_{k-1}\}$.

Let us now show that, as in the fixed loss function case of Spall [1992], the difference $\hat{\theta}_k - \theta^*$ is almost surely (a.s.) convergent to 0 where $\theta^*$ is such that $\theta^*_k \to \theta^*$ as $k \to \infty$. (Some discussion regarding the non-converging $\theta^*_k$ case is given below.) We will use the following regularity conditions, which are similar to those of Spall [1992]; some discussion is provided below on the conditions relative to the control problem here. Note that having $\theta^*_k \to \theta^*$ does not imply the (say) pointwise convergence of $L_k(\cdot)$ to some fixed $L(\cdot)$; in fact $L_k(\theta^*_k)$ may be perpetually varying even when $\theta^*_k = \theta^* \forall k$, as discussed below. We let $\|\cdot\|$ denote any vector norm.

C.0 $E(\epsilon_k^{(+)} - \epsilon_k^{(-)} | \hat{\theta}_1, \hat{\theta}_2, \ldots, \hat{\theta}_{k-1}; \Delta_k) = 0$ a.s. $\forall k$, where $\epsilon_k^{(\pm)}$ is the effective SA measurement noise, i.e., $\epsilon_k^{(\pm)} \equiv \hat{L}_k^{(\pm)} - L_k^{(\pm)}$, with $L_k^{(\pm)} \equiv L_k(\hat{\theta}_{k-1} \pm c_k \Delta_k)$.

C.1 $a_k, c_k > 0$ $\forall k$; $a_k \to 0$, $c_k \to 0$ as $k \to \infty$; $\Sigma_{k=1}^\infty a_k = \infty$, $\Sigma_{k=1}^\infty (a_k/c_k)^2 < \infty$.

C.2 For some $\rho > 0$ and $\forall k$, $E(\epsilon_k^{(\pm)})^2 \leq \rho$, $E(L_k(\hat{\theta}_{k-1} \pm c_k \Delta_k)^2) \leq \rho$, $E(\Delta_{kl}^{-2}) \leq \rho$, $|\Delta_{kl}| \leq \rho$, and $\Delta_{kl}$ is symmetrically distributed about 0 ($l=1,2,\ldots,p$).

C.3 For some $\rho>0$, there exists a $K<\infty$ such that $\forall k \geq K$ the function $L_k(\cdot)$ is continuously thrice differentiable with uniformly (in k) bounded third derivative for all $\theta$ such that $\|\hat{\theta}_{k-1}-\theta\| \leq \rho$ and almost all $\hat{\theta}_{k-1}$.

C.4 For any $\rho>0$ and for each $k \geq 1$ suppose that if $\|\theta-\theta^*\| \geq \rho$, there exists a $\delta_k(\rho)>0$ such that $(\theta-\theta^*)^T g_k(\theta) \geq \delta_k(\rho)$ where $\delta_k(\rho)$ satisfies $$\sum_{k=1}^{\infty} a_k \delta_k(\rho) = \infty$$

and $c_k^2 \delta_k(\rho)^{-1} \to 0$.

Proposition. Let conditions C.0–C.4 hold and suppose there exists a $\theta^*$ such that $\theta^*_k \to \theta^*$ as $k \to \infty$. Then $$\hat{\theta}_k - \theta^* \to 0 \text{ a.s.} \quad (8)$$

Proof. First, from C.0, C.2, and C.3, it can be shown that for all k sufficiently large $$E[\hat{g}_k(\hat{\theta}_{k-1})|\hat{\theta}_{k-1}] = g_k(\hat{\theta}_{k-1}) + b_k, \quad (9)$$

where $c_k^{-2}\|b_k\|$ is uniformly bounded a.s. Now, to show equation (8), we demonstrate that the multivariate analogues of conditions (i)–(iv) of Evans, S. N. and Weber, N. C. [1986], "On the Almost Sure Convergence of a General Stochastic Approximation Procedure," *Bull. Austral. Math. Soc.*, vol. 34, pp. 335–342, apply. with respect to (i) we have by equation (9), C.4, and Thm. 4.2.2 of Chung, K. L. [1974], *A Course in Probability Theory*, Academic, New York, that for any $\rho>0$, $$P(\|\tilde{\theta}_{k-1}\| \geq \epsilon, a_k \tilde{\theta}_{k-1}^T (g_k(\hat{\theta}_{k-1})+b_k)<0 \text{ i.o.}) \leq P(\tilde{\theta}_{k-1}^T b_k < -\delta_k(\rho) \text{ i.o.}) \to 0$$

where $\tilde{\theta}_{k-1} \equiv \hat{\theta}_{k-1} - \theta^*$ and i.o. denotes infinitely often, which shows (i). Then from the fact that $a_k \to 0$ and facts that C.3 and equation (9) indicate that $$\limsup_{k \to \infty} \|g_k(\hat{\theta}_{k-1}) + b_k\|(1 + \|\tilde{\theta}_{k-1}\|)^{-1} < \infty \text{ a.s.}$$

we know that (ii) holds. The fact that $$\sum_{k=1}^{\infty} a_k^2 E\|\hat{g}_k(\hat{\theta}_{k-1}) - E(\hat{g}_k(\hat{\theta}_{k-1})|\hat{\theta}_{k-1})\|^2 < \infty$$

follows easily by C.1 and C.2, which shows (iii). Finally, with respect to (iv), we must show $$P\left(\liminf_{k \to \infty} \|\tilde{\theta}_{k-1}\| > 0, \sum_{k=1}^{\infty} a_k\|g_k(\hat{\theta}_{k-1}) + b_k\| < \infty \right) = 0. \quad (10)$$

For any sample point in the underlying sample space such that $\liminf_{k \to \infty} \|\tilde{\theta}_{k-1}\| > 0$ take $0 < \rho < \liminf_{k \to \infty} \|\tilde{\theta}_{k-1}\|$. Then $\exists$ a $k_1(\rho) < \infty$ such that $\|\tilde{\theta}_{k-1}\| \geq \rho \forall k \geq k_1$, which by C.4 indicates that $\exists$ a $\delta'_k(\rho) > 0$ such that $\|g_k(\hat{\theta}_{k-1})\| \geq \delta'_k(\rho) \forall k \geq k_1$. Further, by the uniform bound on $c_k^{-2}\|b_k\|$ we have from C.4 (except, of course, on a set of measure 0) that $\exists$ a $k_2(\rho) < \infty$ such that $\|b_k\| \leq \delta'_k(\rho)/2 \forall k \geq k_2$. Hence for this sample point, we have $$\sum_{k=1}^{\infty} a_k\|g_k(\hat{\theta}_{k-1}) + b_k\| \geq \sum_{k=k^*}^{\infty} a_k \delta_k'(\rho)/2 = \infty$$

by C.1 and C.4 where $k^* = \max\{k_1, k_2\}$. Since $\exists$ such a $k^*$ and $\delta'_k$ for almost all sample points such that $\liminf_{k \to \infty} \|\tilde{\theta}_{k-1}\| > 0$, this shows (3.4) (and hence (iv)), which completes the proof. Q.E.D.

Conditions C.0–C.4 will now be commented on. Condition C.0 is critical in ensuring that $\hat{g}_k(\cdot)$ is an unbiased estimator of $g_k(\cdot)$ to within an $O(c_k^2)$ bias, where $c_k \to 0$ by C.1. Condition C.1 presents some standard conditions on the SA gains (as discussed below, however, in a system with nonstationary dynamics—where $\theta^*_k$ does not converge—it is generally best to not satisfy this condition). C.2 ensures that the variability of $\hat{g}_k(\cdot)$ is not so large as to potentially cause divergence of the algorithm; the boundedness condition on $E(\Delta_{kl}^{-2})$ is particularly important for the validity of $\hat{g}_k(\cdot)$ as an estimator of $g_k(\cdot)$ and for the convergence of $\hat{\theta}_k$, and prevents, e.g., taking $\Delta_{kl}$ as uniformly or normally distributed (taking $\Delta_{kl}$ as symmetrically Bernoulli distributed satisfies this condition and has proven effective in numerical studies). C.3 is used to ensure that $L_k(\cdot)$ is sufficiently smooth so that $\hat{g}_k(\cdot)$ is nearly an unbiased estimator of $g_k(\cdot)$ based on a third order expansion of $L_k(\cdot)$ about $\hat{\theta}_{k-1}$. Of course, C.3 translates into differentiability conditions on $\phi_k(\cdot)$ and $h_k(\cdot)$ in the system model (equations (1) and (2)) and, with the self-tuning method of FIG. 1b, into differentiability conditions on the control law $\pi_k(\cdot)$. C.4 ensures that if we are at a value $\hat{\theta}_{k-1}$ not at $\theta^*$, the gradient $g_k(\cdot)$ is sufficiently steep (as well as pointing towards $\theta^*$) so that there will be a tendency to push the next value $\hat{\theta}_k$ towards $\theta^*$.[2] Note that the nonuniformity (in k) that is allowed for $\delta_k(\rho)$ permits $L_k(\cdot)$ to "flatten out" in some fixed region around $\theta^*$ as k gets large provided that this flattening does not occur too fast.

[2] This condition also effectively requires that the initial condition $\hat{\theta}_0$ be sufficiently close to $\theta^*$ so that $\hat{\theta}_k$ does not get stuck in local minima of $L_k$ (the same issue arises, of course, in gradient search algorithms such as back-propagation). We have yet to investigate other approaches in control problems, instead of relying on the standard approach of experimenting with different initial conditions to see that we are converging to the same minimum.

The assumption in the Proposition that there exists a $\theta^*$ such that $\theta^*_k \to \theta^*$ is, in fact, quite modest given that the even stronger assumption that $\theta^*_k = \theta^* \forall k$ holds in many applications, including settings where $L_k(\theta)$ is perpetually varying at any $\theta$ (as results from, among other things, a time-varying target $t_k$). In particular, when $\phi_k(\cdot) = \phi(\cdot)$ and $h_k(\cdot) = h(\cdot) \forall k$, the control law can generally be expressed as $u_k = u(\cdot)$ for some $u(\cdot)$ not indexed by k. Then, there will generally exist a unique $\theta^*$ that yields the best possible approximation to $u(\cdot)$ (this is irrespective of whether $L_k(\cdot)$ is time varying). This is true in either the case where the FA represents $u(\cdot)$ directly (FIG. 1a) or in the self-tuning case of partial prior information where the FA is used to approximate some $f_k(\cdot) = f(\cdot)$ in a predetermined control law (FIG. 1b). The more general condition of the Proposition, $\theta^*_k \to \theta^*$, allows for a system with transient effects (i.e., one where $\phi_k(\cdot) \to \phi(\cdot)$ and $h_k(\cdot) \to h(\cdot)$ in a pointwise manner).

Let us now illustrate how one of the main regularity conditions, C.0, can be satisfied in a general control problem (the other regularity conditions, C.1–C.4, are fairly natural in terms of most search algorithms or are directly dependent on user-specified quantities). Suppose that the system (equations (1) and (2)) evolves according to $$x_{k+1} = \bar{\phi}_k(x_k, u_k) + w_k,$$

$$y_k = x_k + v_k$$

where $\{w_k\}$ and $\{v_k\}$ are i.i.d. sequences with finite second moments ($v_k$ and $w_{k+1}$ may be dependent) and $\bar{\phi}_k(\cdot)$ is some (unknown) function. Further assume that we are using the practical control strategy described above, where we generate the sequence of measurements $\{\ldots y_{k+1}^{(+)}, y_{k+1}^{(-)}, y_{k+1}, \ldots\}$ without resetting the system from one state to the previous state. It can be readily shown that C.0 would also hold in other implementation strategies as well (such as where the state can be reset). Then according to the definition of $\epsilon_k^{(\pm)}$ in C.0, and using the standard quadratic loss function in equation (3), we can write (assuming without loss of generality that $B_k$, $E(w_k)$, $E(v_k)$, and $t_{k+1}$ are identically $0 \forall k$ and that $x_k$, $y_k \in \mathbb{R}^1$ with $A_k=1 \forall k$), $$\epsilon_k^{(+)}-\epsilon_k^{(-)}=(\bar{\phi}_k^{(+)}+w_k^{(+)}+v_{k+1}^{(+)})^2-(\bar{\phi}_k^{(-)}+w_k^{(-)}+v_{k+1}^{(-)})^2 -E[(\bar{\phi}_k+w_k+v_{k+1})^2|\theta_k=\hat{\theta}_{k-1}+c_k\Delta_k]+E[(\bar{\phi}_k+w_k+v_{k+1})^2|\theta_k=\hat{\theta}_{k-1}$$

where $$\bar{\phi}_k^{(+)}=\bar{\phi}_k(x_k,u_k\ (\hat{\theta}_{k-1}+c_k\Delta_k,t_{k+1},\ I_k^{(+)}))$$

$$\bar{\phi}_k^{(-)}=\bar{\phi}_k(x_{k+1}^{(+)},u_k\ (\hat{\theta}_{k-1}-c_k\Delta_k,t_{k+1},I_k^{(-)}))$$

and $w_k^{(\pm)}$, $v_{k+1}^{(+)}$ are the corresponding noises. Then by $$E(\bar{\phi}_k^{(+)2}|\hat{\theta}_1,\ldots,\hat{\theta}_{k-1};\Delta_k)=E[E\ (\bar{\phi}_k^2|x_k,\ I_k^{(+)},\ \theta_k=\hat{\theta}_{k-1}+c_k\Delta_k)|\hat{\theta}_{k-1},\Delta_k]=E(\bar{\phi}_k^2|\theta_k=\hat{\theta}_{k-1}+c_k\Delta_k),$$

with obvious parallel arguments for $\bar{\phi}_k^{(-)}$, we have $$E(\epsilon_k^{(+)}-\epsilon_k^{(-)}|\ \hat{\theta}_1,\ldots,\hat{\theta}_{k-1};\Delta_k)=E\ (\epsilon_k^{(+)}-\epsilon_k^{(-)}|\hat{\theta}_{k-1};\Delta_k)=0.$$

This shows C.0.

Let us close with a brief discussion of the constant gain setting where we take $a_k=a>0$ and/or $c_k=c>0 \forall k$. It is known that SA algorithms with such gains are better able to track a time-varying root ($\theta^*_k$) than the usual decaying gain algorithms, which is relevant when $\theta^*_k$ is non-convergent. This is likely to occur, e.g., when the process dynamics $\phi_k(\cdot)$ and/or measurement apparatus $h_k(\cdot)$ are perpetually time-varying due to cyclic behavior or when they change due to a failure or wear and tear of components in the system. In fact, because of their ease of use, such constant gains are sometimes applied in SA (or SA-type) algorithms even when $\theta^*_k=\theta^* \forall k$, although it is known that they preclude the formal a.s. convergence of decaying gain algorithms.

What follows presents the results of studies on three different nonlinear models, one that is a stochastic generalization of a model in Narendra, K. S. and Parthasarathy, K. [1990], "Identification and Control of Dynamical Systems Using Neural Networks," *IEEE Trans. Neural Nets.*, vol. 1, pp. 4–26, (N & P hereafter), one that is a stochastic, multivariate generalization of a model in Chen, F. C. [1990], "Back-Propagation Neural Networks for Nonlinear Self-Tuning Adaptive Control," *IEEE Control Syst. Mag.*, April, pp. 44–48, (hereafter Chen [1990]) and one that is a model for waste-water treatment in Dochain, D. and Bastin, G. [1984], "Adaptive Identification and Control Algorithms for Nonlinear Bacterial Growth Systems," *Automatica*, vol. 20, pp. 621–634 (hereafter Dochain and Bastin [1984]). The studies include a comparison of the SPSA and FDSA parameter estimation algorithms and a comparison of the direct approximation (DA) (FIG. 1a) and self-tuning (ST) (FIG. 1b) controllers.

All studies here are based on $A_k=I$ and $B_k=0$ in the loss function equation (3) (i.e., a minimum variance regulator). Further, to facilitate having a fair evaluation of the weight estimation algorithms, we produce a nominal measurement ($y_k$) at every iteration, as discussed above. The performance of the various techniques will be evaluated by comparing the root-mean-square (RMS) tracking error of the nominal states as normalized by the dimension of $y_k$, i.e., RMS at time k is $[(y_k-t_k)^T(y_k-t_k)/\dim\ (y_k)]^{1/2}$. For the FA, we will use a feedforward neural network that has an input layer, two hidden layers, and an output layer, as in N & P and Chen [1990] (we also briefly consider a polynomial FA at the end of the section). The hidden layer nodes are hyperbolic tangent functions (i.e., $(e^x-e^{-x})/(e^x+e^{-x})$ for input x) while the output nodes are linear functions (simply x). Each node takes as an input (x) the weighted sum of outputs of all nodes in the previous layer plus a bias weight not connected to the rest of the network (hence an $N_{4,20,10,2}$ network, in the notation of N & P, has 100+210+22=332 weights to be estimated). For the weight estimation, we will consider different forms of the SPSA algorithm, denoted SPSA-q, where q denotes the number of individual gradient approximations of the form in equation (7) that are averaged to form $\hat{g}_k(\cdot)$ (hence an SPSA-q algorithm uses 2q measurements to form $\hat{g}_k(\cdot)$). For the SPSA algorithms we take the perturbations $\Delta_{ki}$ to be Bernoulli $\pm 1$ distributed, which satisfies the relevant regularity conditions discussed above.

Figure 2:
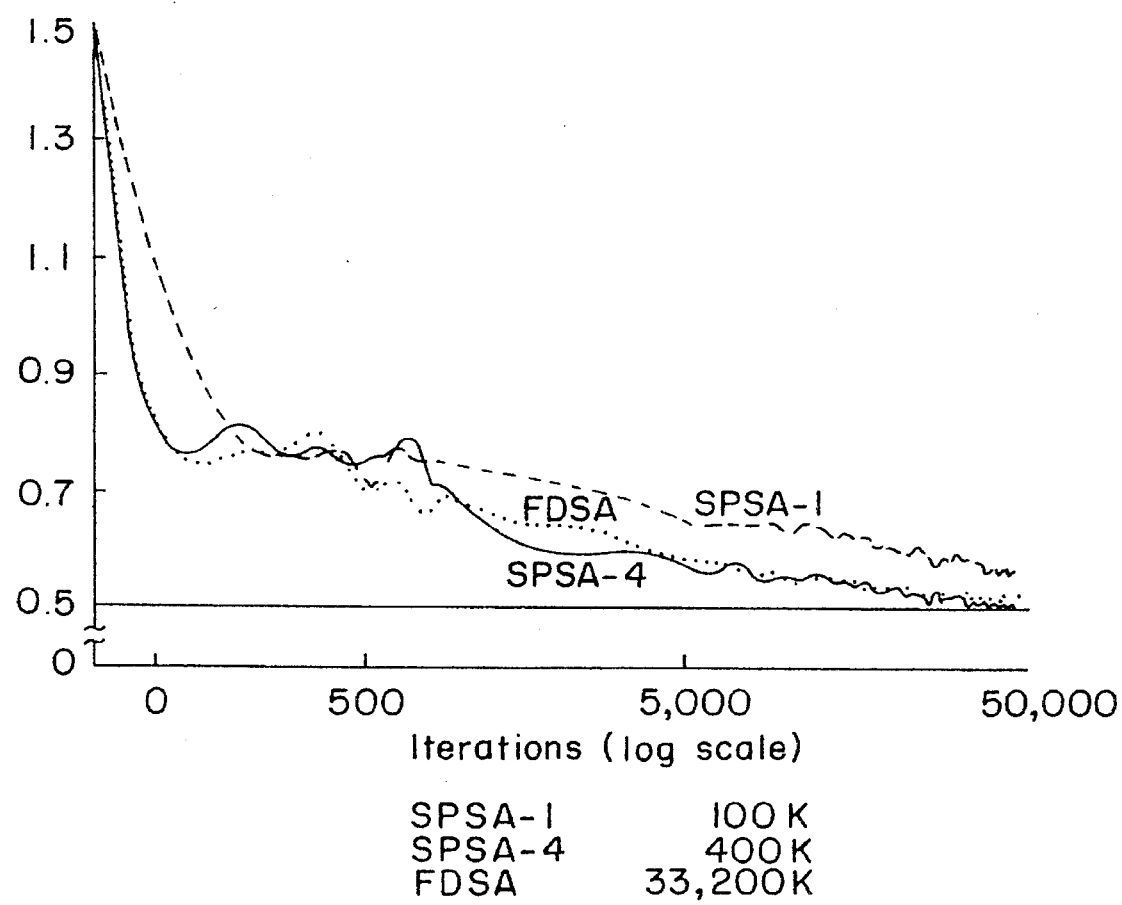
FIG. 2, illustrates the experimental results of the application of the method of the invention to an additive control system.

In the first study (additive control system), the model used for producing measurements is a generalization of the two-dimensional model with additive control given in N & P to include additive (independent) noise, i.e., $$x_{k+1}=f(x_k)+u_k+w_k,\ w_k\sim N(0,\sigma^2 I),\ y_k=x_k \quad (11)$$

where, as in eqn. (18) of N & P, $$f(x_k)=\frac{1}{1+x_{k2}^2}\begin{bmatrix}x_{k1}\\x_{k1}x_{k2}\end{bmatrix}$$

with $x_{ki}$ the $i^{th}$ (i=1,2) component of $x_k$ (the estimation algorithm here does not assume knowledge of $f(x_k)$ or the form in equation (11)). Further we take the two-dimensional target sequence $\{t_k\}$ to be as given in FIG. 31 of N&P. FIG. 2 presents the main results for our study of the model in equation (11) based on the practical control procedure discussed above (including the generation of the optional nominal state for purposes of plotting the RMS error). We use the DA method of control (FIG. 1a) with $I_k=\{y_k\}$. The RMS curves in the figures are based on the sample mean of four independent runs with different initial weights $\hat{\theta}_0$, where the elements of $\hat{\theta}_0$ were generated randomly from a uniform (−0.1, 0.1) distribution (the same four initial weight vectors were used for the three different curves). To further smooth the resulting error curves and to show typical performance (not just case-dependent variation), we applied the MATLAB low-pass interpolating function INTERP to the error values based on the average of four runs. The curves shown in FIG. 2 are based on this combination of across-realization averaging and across-iteration interpolation. Each of the curves was generated by using SA gains of the form $a_k=A/k^{0.602}$ and $c_k=C/k^{0.101}$ with A, C>0 (the exponents were chosen to satisfy the SA conditions discussed above). For each SA algorithm we attempted to tune A and C to maximize the rate of decay in RMS error (as would typically be done in practice)[3]; the values satisfied $0.02 \leq A \leq 0.08$ and $0.10 \leq C \leq 0.25$. The value $x_0$ was set to $(1.5, 1.5)^T$ and $\sigma=0.50$, so the initial RMS error is 1.5 and the minimum achievable long-run RMS error is 0.50.

[2]The choice of A, C is important for adequate performance of the algorithm (analogous to choosing the step-size in back-propagation). For example, choosing A too small may lead to an excessively slow reduction in tracking error while choosing an A too large may cause the system to go unstable (so for practical problems, it might be appropriate to begin with a relatively small A and gradually increase it until there is an adequate convergence rate but little chance of going unstable).

FIG. 2 shows that both the SPSA and FDSA algorithms yield controllers with decreasing RMS tracking error over time. The long-run performance of SPSA-4 and FDSA is virtually identical, with SPSA-4 and FDSA achieving terminal RMS errors of 0.50 and 0.51 respectively (vs. the theoretical limit of 0.50); for the SPSA-1 algorithm the terminal error was 0.57. The critical observation to make here is that the SPSA algorithms achieved their performance with a large savings in data: each iteration of SPSA-1 and SPSA-4 required only two measurements and eight measurements, respectively, while each iteration of FDSA needed 664 measurements. Hence FIG. 2 illustrates that SPSA-4 yielded approximately the same level of tracking error as the standard FDSA algorithm with an 83-fold savings in state measurements. The data savings seen in FIG. 2 is typical of that for a number of other studies involving SPSA and FDSA that we have conducted on the model of equation (11) as well as on other nonlinear models; in fact, even greater data savings are typical with more complex networks (as might be needed in higher-dimensional systems or in systems where $u_k$ is not simply additive). Note also that the curves in FIG. 2 have the typical shape of many optimization algorithms in that there is a sharp initial decline followed by a slow decline. Hence over 65 percent of the possible reduction in RMS error, which may be all that is required in some applications, is achieved in SPSA-4 with fewer than 100 iterations.

The model considered for our second study has the widely studied affine-nonlinear form $$x_{k+1} = f^{(1)}(x_k) + f^{(2)}(x_k)u_k + w_k$$

$$y_k = x_k \qquad (12)$$

(see, e.g., Chen [1990] for discrete time or Nijmeijer, H. and van der Schaft, A. J. [1990], *Nonlinear Dynamical Control Systems*, Springer-Verlag, New York.(hereafter Nijmeijer and van der Schaft [1990]) for continuous time), where $f^{(1)}$ and $f^{(2)}$ are a vector and matrix respectively representing unknown system dynamics. The primary goal in this study is to compare the DA and ST methods of control, although we also present a further comparison of SPSA and FDSA. We will take $x_k \in \mathbb{R}^2$ and for purposes of generating the data, take (as before) $w_k \sim N(0, \sigma^2 I)$ (and independent), $x_0 = (1.5, 1.5)^T$, and $$f^{(1)}(x_k) = \begin{pmatrix} .5\sin(x_{k1}) - .1x_{k2} + .1 \\ .5\cos(x_{k2}) - .1x_{k1} + .1 \end{pmatrix}, \qquad (13)$$

$$f^{(2)}(x_k) = \begin{pmatrix} 5 + .5\sin(x_{k1}) & 0 \\ 0 & 5 + .5\cos(x_{k2}) \end{pmatrix}.$$

Similar to Chen [1990], the two components of the target sequence will be identical and will be periodic with one period being a 50 iteration sine wave followed by a 50 iteration square wave with both waves having amplitude 1.2. As in the first study, we used decaying SA gains, which were tuned to approximately optimize the performance of the given algorithm. For the ST controller we take $$u_k = \pi(\hat{f}(x_k), t_{k+1}) = \hat{f}^{(2)}(x_k)^{-1}(t_{k+1} - \hat{f}^{(1)}(x_k)), \hat{f} = (\hat{f}^{(1)}, \hat{f}^{(2)}),$$

and, analogous to Chen [1990], we model $f(\cdot)$ by an $N_{2,20,10,4}$ neural network for the $f^{(1)}$ part and the two unknown diagonal elements of $f^{(2)}$ (this implementation assumes that the off-diagonal elements are known to be 0 and the $\hat{f}^{(2)}$ values are scaled away from zero). For the DA controller, of course, we assume no knowledge of the structure in equations (12) and (13) and use an $N_{4,20,10,2}$ network with $I_k = \{y_k\}$.

Figure 3:
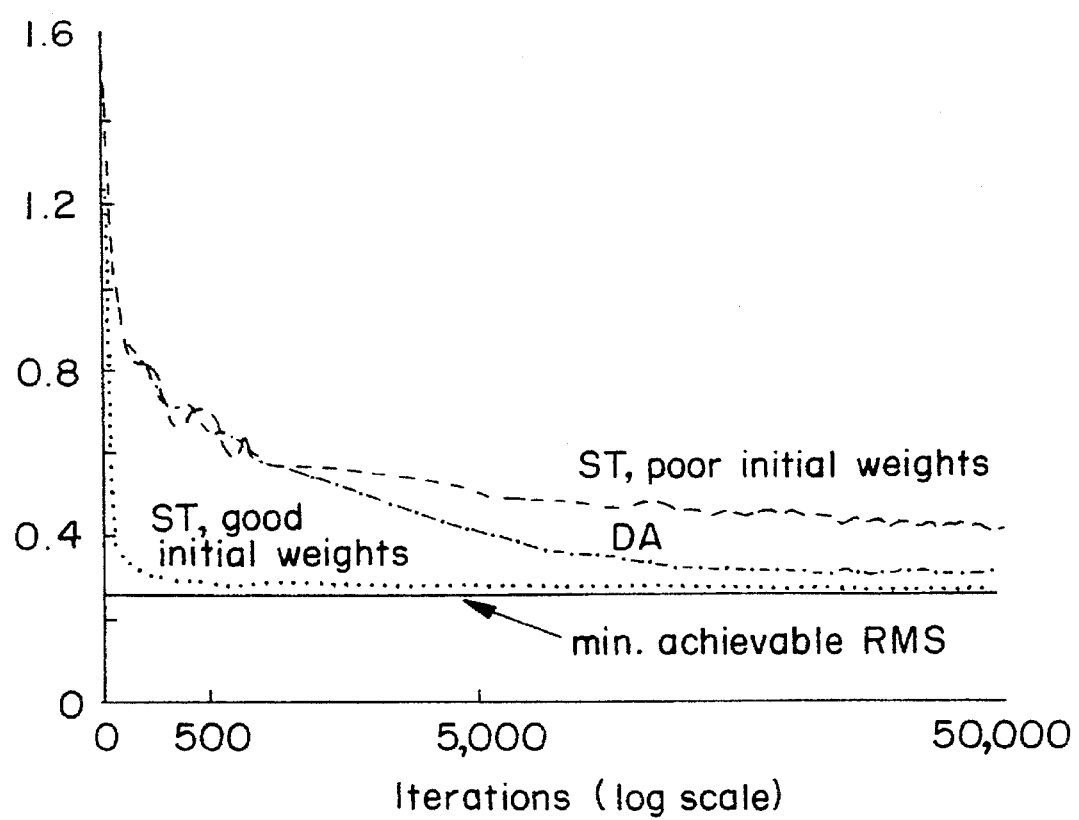
FIG. 3, illustrates the experimental results of the application of the method of the invention to an affine-nonlinear model.

FIG. 3 presents the results for our first study of the affine-nonlinear model; this study uses the SPSA-1 algorithm and the practical control algorithm discussed above (the same averaging and interpolation used in FIG. 2 was used here). As with the studies above the initial weights $\hat{\theta}_0$ were determined randomly according to a uniform (−0.1, 0.1) distribution, except for the two bias weights corresponding to $f^{(2)}$ in the ST method. These were initialized differently to reflect a varying level of prior information about the system: in the curve labeled "good initial weights" these two biases were set to 5.0 and in the curve labeled "poor initial weights" the two biases were set to 2.0. The ST method is quite sensitive to the prior information, but can outperform DA if the information is good (the terminal RMS error for the good ST run is 0.26 versus a theoretical limit of 0.25 and the DA value of 0.30). On the other hand, DA outperforms ST when the initial conditions for ST are poor. This result seems to follow from the inherent instability of $x_k$ due to the presence of a matrix inverse $(\hat{f}^{(2)})^{-1}$ in the ST controller. To avoid the instability associated with the near-singularity of $\hat{f}^{(2)}$ that sometimes occurred when the initial conditions were poor, the SA coefficient A needed to be set to a level so small that the convergence of $\hat{\theta}_k$ was inhibited. This helps explain the difference between the two ST curves in FIG. 3. In contrast, the DA method proved to be more numerically stable since it did not involve matrix inversion.

To verify that this phenomenon was not unique to the set-up above, studies for a number of other affine-nonlinear models and/or other neural network configurations were conducted, and it was consistently found that ST outperformed DA only when it had good initial weights on the $f^{(2)}$ portion of the NN output. This study has indicated that even when enough information for a given system is available to implement the ST method, it may still be valuable to examine the performance of the DA method. This appears to be especially true when the control functional $\pi(\cdot)$ is such that $x_k$ may be very sensitive to deviations from the true $f(\cdot)$ in the control.

Our other numerical study for equations (12) and (13) illustrates the relative performance of SPSA and FDSA in a deterministic ($\sigma=0$) system (to complement the stochastic comparison in the study for equation (11)). As with equation 11, the DA control method was used. The mean and terminal RMS errors for SPSA-1 were, respectively, 0.11 and 0.08 versus 0.13 and 0.10 for FDSA. Thus SPSA outperforms FDSA with less than 1/300 the number of required system measurements.

The final study presents some preliminary results related to a model for waste-water treatment in Dochain and Bastin [1984] (D&B). This is a model of affine-nonlinear form where the aim is to control the output substrate concentration based on adjusting the dilution rate at the input to a fermentation process. The results below are based on producing system measurements according to eqns. (8) and (9) of D&B, where the parameters in these equations are taken as in the simulations of D&B. This model has time-varying dynamics (from FIG. 6 of D&B) and a time-varying target (from FIG. 4 of D&B).

Two types of DA controls were implemented, one based on a neural network and one based on a third-order polynomial. The SPSA-1 algorithm with constant gains ($a_k=a$, $c_k=c$) was considered to account for the time-varying dynamics, as discussed above. The minimum achievable RMS error for this study was 0. For the neural network controller, the RMS error reduces in 20K iterations from 0.62 to 0.006 while for the polynomial controller the reduction is from 0.62 to 0.009. As with the models above, there is a steep initial decay in the RMS errors, with approximately 70 percent of the possible decay occurring within the first 100 iterations. The above results offer promise for future study of such waste treatment models.

A practical implementation of the method of the invention is for optimal traffic control that is able to automatically adapt to both daily non-recurring events (accidents, temporary lane closures, etc.) and to long-term evolution in the transportation system (seasonal effects, new infrastructure, etc.).

Through use of an advanced transportation management system (ATMS), that includes sensors and computer-based control of traffic lights, a municipality seeks to more effectively use the infrastructure of the existing transportation network, thereby avoiding the need to expand infrastructure to accommodate growth in traffic. A major component of ATMS is to develop means to optimally control traffic flow in real-time.

There are, of course, numerous challenges to achieving optimal traffic flow in a complex transportation system. These include being able to accommodate accidents and other unpredictable events in real-time and being able to accommodate long-term changes in the transportation system without having to do a manual recalibration of the control algorithm in the ATMS software. It appears that the vast majority of focus in ATMS thus far has been on the hardware (sensors, detectors, and other surveillance devices) and data processing aspects. In fact, however, the advances in these areas will be largely wasted unless they are coupled with appropriate analytical techniques for adaptive control. This analytical aspect is the problem to be solved by the invention.

The approach to traffic control will be based on applying the inventive technique for adaptive control discussed above using neural networks (NNs) as the FA. NNs are mathematical function approximators that are patterned loosely after the design of the human brain. They have a unique ability to "learn" about and to improve the complex processes they control, in much the same way that scientists believe the human brain learns. Control of a large transportation system, with different modes (auto, transit, bicycle, etc.) and with hundreds of interrelated traffic lights and arterial flows, seems to be an ideal candidate process for a NN application.

Essential to the use of NNs in adaptive control is the estimation of the connection weights in the NN. Estimating the weights corresponds to the above-mentioned learning process. In the adaptive control approach here, the weights of the NN are estimated while the system is being controlled. The weight estimation is accomplished using the stochastic approximation algorithm that is based on a simultaneous perturbation gradient approach of the invention.

The invention can be successfully applied to automatically control traffic signals so as to achieve optimal flow conditions on a network-wide basis. Inputs to the NN-based controller would include real-time measurements of traffic flow conditions, previous signal control settings, and desired flow levels for the different modes of transportation. Th NN controller would be trained with weights established using the simultaneous perturbation stochastic approximation (SPSA) methodology of the invention. The resulting control algorithm would adjust to changing flow patterns and provide a robust capability to accommodate accidents and other non-recurring events.

A major difference between the invention and other transportation control algorithms that are used or have been proposed (including those with NNs), is that the SPSA-based approach does not require the development of models describing system flow dynamics. The NN is used only for the controller (i.e., no NN or other mathematical model is needed for the system dynamics). This allows for the control algorithm to more readily adjust to long-term changes in the transportation system. As noted by Rowe, E. (1991), "The Los Angeles Automated Traffic Surveillance and Control System," *IEEE Trans. on Vehicular Tech.*, vol. 40, pp. 16–20, it is a very expensive and labor intensive job to periodically recalibrate the system model to accommodate the system evolution (and hence is not done as frequently as it should be in many jurisdictions). Since the invention does not require a system model, this problem is avoided. Furthermore, the invention avoids the seemingly hopeless problems of (1) attempting to mathematically model human behavior in a transportation system (e.g., modelling how people would respond to radio announcements of an accident situation) and (2) of modelling the complex interactions among flows along different arteries.

The application of NNs to traffic control has been proposed and examined by others. It is the use of the SPSA methodology of the invention to train and continually adjust the NN weights that is unique to this approach and is critical to the successful development of a NN-based control mechanism that readily adapts to changes in the transportation network without building a model (NN or otherwise) of the traffic flow dynamics.

The method of the invention solves the problem of controlling nonlinear stochastic systems with unknown process and measurement equations. The invention differs from other methods in that it does not require an explicit model for the open-loop behavior of the system and, consequently, does not require a prior system identification step. Rather, the invention fills the void left by the current unavailability of methods for directly adjusting the control parameters based on the output error (between the plant and reference [target] outputs). The invention encompasses two different methods—direct approximation (DA) control and self-tuning (ST) control—where DA applies when there is very little information available about the system dynamics and ST applies when some (still incomplete) information is available.

Since full knowledge of the structure of the equations describing the system is not assumed, it is not possible to calculate the gradient of the loss function for use in gradient-descent-type search algorithms. Therefore, a stochastic approximation-based method for the estimation of the controller is described, which is based on a "simultaneous perturbation" approximation to the unknown gradient. This method relies on observing the system state at two (or a low multiple of two) levels of the control to construct the gradient approximation. Both theoretical and empirical evidence indicate that this SPSA method for weight estimation is much more efficient (in terms of the number of system measurements needed) than more standard Kiefer-Wolfowitz-type SA methods based on finite-difference approximations to the gradient.

We claim:

1. A method for approximating a controller for a nonlinear, discrete-time, closed-loop, stochastic system wherein the nonlinear functions governing the system dynamics and measurement process are unknown, the method comprising the steps of:

obtaining information about the system;

inputting the information about the system into a data processing means;

approximating the controller using the data processing means and the information about the system comprising the steps of:

selecting a single function approximator to approximate directly the controller;

estimating the unknown parameters of the single function approximator in the controller using a stochastic approximation algorithm; and using the single function approximator to approximate the controller, wherein an output of the single function approximator is the controller; and using the controller to control the system.

2. The method as recited in claim 1, the selecting a single function approximator step comprising the step of selecting a single continuous function approximator to approximate the controller.

3. The method as recited in claim 1, the estimating the unknown parameters step comprising the step of estimating the unknown parameters of the single function approximator in the controller using a simultaneous perturbation stochastic approximation algorithm.

4. The method as recited in claim 3, the selecting a single function approximator step comprising the step of selecting a neural network to approximate the controller.

5. The method as recited in claim 4, the selecting a neural network step comprising the step of selecting a multilayered, feed-forward neural network to approximate the controller.

6. The method as recited in claim 4, the selecting a neural network step comprising the step of selecting a recurrent neural network to approximate the controller.

7. The method as recited in claim 3, the selecting a single function approximator step comprising the step of selecting a polynomial to approximate the controller.

8. The method as recited in claim 3, the selecting a single function approximator step comprising the step of selecting a spline to approximate the controller.

9. The method as recited in claim 3, the selecting a single function approximator step comprising the step of selecting a trigonometric series to approximate the controller.

10. The method as recited in claim 3, the selecting a single function approximator step comprising the step of selecting a radial basis function to approximate the controller.

\* \* \* \* \*